US009385771B2

(12) United States Patent
Lamers

(10) Patent No.: US 9,385,771 B2
(45) Date of Patent: Jul. 5, 2016

(54) RELEASE MECHANISM FOR A SMART CARD

(75) Inventor: Ramon Lamers, Duisburg (DE)

(73) Assignee: BlackBerry Limited, Waterloo, Ontario (CA)

(*) Notice: Subject to any disclaimer, the term of this patent is extended or adjusted under 35 U.S.C. 154(b) by 344 days.

(21) Appl. No.: 12/691,955

(22) Filed: Jan. 22, 2010

(65) Prior Publication Data

US 2011/0183716 A1    Jul. 28, 2011

(51) Int. Cl.
H04M 1/00      (2006.01)
H04B 1/3816   (2015.01)
H04M 1/02      (2006.01)

(52) U.S. Cl.
CPC .......... H04B 1/3816 (2013.01); *H04M 1/026* (2013.01)

(58) Field of Classification Search
CPC .................... H04B 1/3816; H04M 2250/14
USPC ......................................................... 455/558
See application file for complete search history.

(56) References Cited

U.S. PATENT DOCUMENTS

| 5,257,414 | A | 10/1993 | Trahan |
| 6,022,225 | A | 2/2000 | Chapin et al. |
| 6,814,597 | B1 | 11/2004 | Kao |
| 7,011,537 | B1 * | 3/2006 | Wu .............................. 439/159 |
| 7,367,828 | B2 | 5/2008 | Matsukawa et al. |
| 7,503,806 | B2 | 3/2009 | Lin |
| 2001/0021657 | A1 * | 9/2001 | Morita ........................... 455/550 |
| 2002/0177337 | A1 | 11/2002 | Chun-Lung |
| 2003/0195020 | A1 * | 10/2003 | Kubo .......................... 455/575.1 |
| 2006/0234536 | A1 | 10/2006 | Kuan |
| 2007/0107922 | A1 * | 5/2007 | Park et al. ........................ 174/50 |
| 2010/0098920 | A1 * | 4/2010 | Hou et al. ...................... 428/201 |
| 2011/0143823 | A1 * | 6/2011 | Holman et al. ............ 455/575.4 |

FOREIGN PATENT DOCUMENTS

EP     1916776     4/2008

OTHER PUBLICATIONS http://content.zdnet.com/2346-9595_22-210341-16.html.
Extended European Search Report dated Jun. 30, 2010. In corresponding application No. 10151386.9.

* cited by examiner

*Primary Examiner* — Lester Kincaid
*Assistant Examiner* — Andy Gu
(74) *Attorney, Agent, or Firm* — Jon Gibbons; Fleit Gibbons Gutman Bongini & Bianco PL

(57) ABSTRACT

A smart card receiving assembly for a handheld communication device includes a housing, a release arm, and a smart card receiver. The housing forms an access compartment for receiving a battery and a smart card. The release arm is slidingly coupled to the housing and includes an extension extending downward. The smart card receiver is adapted to receive a smart card and includes a channel adapted to receive the extension. The smart card receiver can be made of metal to provide rigidity to the handheld communication device. When the release arm is moved from a first position to a second position, the extension can force the smart card from a seated position to an unseated position with the smart card sliding at least partially out of the smart card receiver and into the access compartment.

20 Claims, 10 Drawing Sheets

US 9,385,771 B2

RELEASE MECHANISM FOR A SMART CARD

FIELD OF TECHNOLOGY

The present disclosure relates generally to a release mechanism. More specifically, the present disclosure relates to a release mechanism for a smart card, e.g., a SIM card, in a handheld communication device.

BACKGROUND

With the advent of more robust mobile electronic systems, advancements of handheld communication devices are becoming more prevalent. Handheld communication devices can provide a variety of functions including, for example, telephonic, electronic messaging and other personal information manager (PIM) application functions. Handheld communication devices include mobile stations such as simple cellular telephones, smart telephones, wireless PDAs, wired PDAs, and reduced-sized laptop computers. Each handheld communication device can include a smart card, e.g., a subscriber identity module (SIM) card, removable user identity module (R-UIM) card, universal integrated circuit card (UICC) or any other suitable card. The smart card stores a service-subscriber key (IMSI) which is a unique serial number which can identify a subscriber of the handheld communication device. The smart card can include the IMSI, security authentication and ciphering information, temporary information related to a local network (such as a temporary id for the local network), a list of services that the user has access to and two passwords: a personal identification number (PIN) and pin unlock key (PUK). Conventional smart cards for handheld communication devices come in two sizes: credit card (85.60 mm×53.98 mm×0.76 mm) and miniature size (25 mm×15 mm×0.76 mm) with the miniature size being more popular for handheld communication devices.

In order to exchange, change, or reset a handheld communication device, the smart card is removed. Due to limited spacing, removing a smart card from a handheld communication device can be difficult. For example, some users may use the eraser of a pencil to apply downward pressure and then pressure to move the smart card away from a smart card holder. Removing a smart card using such a technique can damage the smart card, the handheld communication device, or both.

BRIEF DESCRIPTION OF THE DRAWINGS

Embodiments of the present application will now be described, by way of example only, with reference to the attached Figures, wherein.

DETAILED DESCRIPTION

Figure 1A:
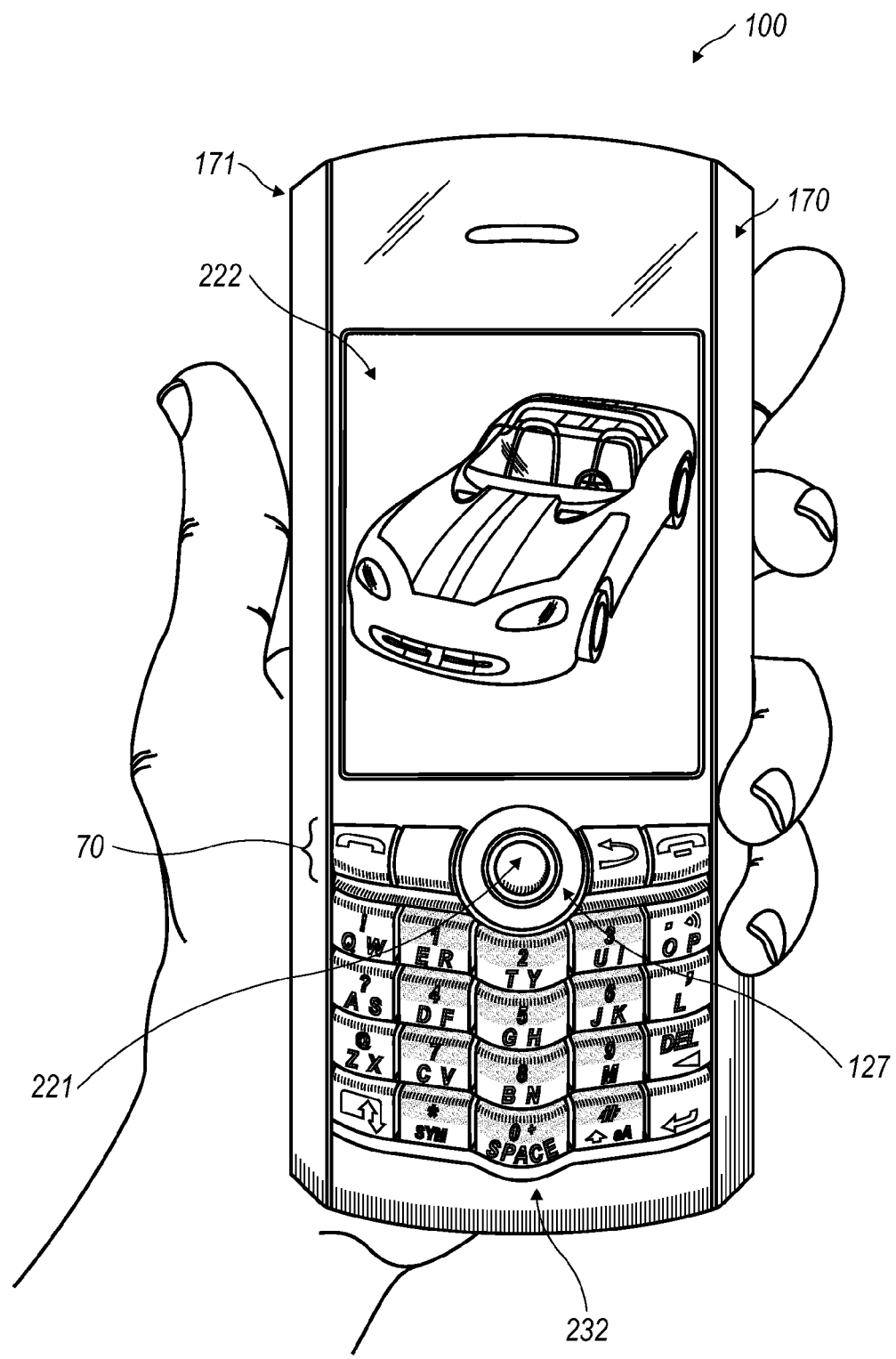
FIG. 1A is a front view of a handheld communication device having a reduced QWERTY keyboard in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Figure 1B:
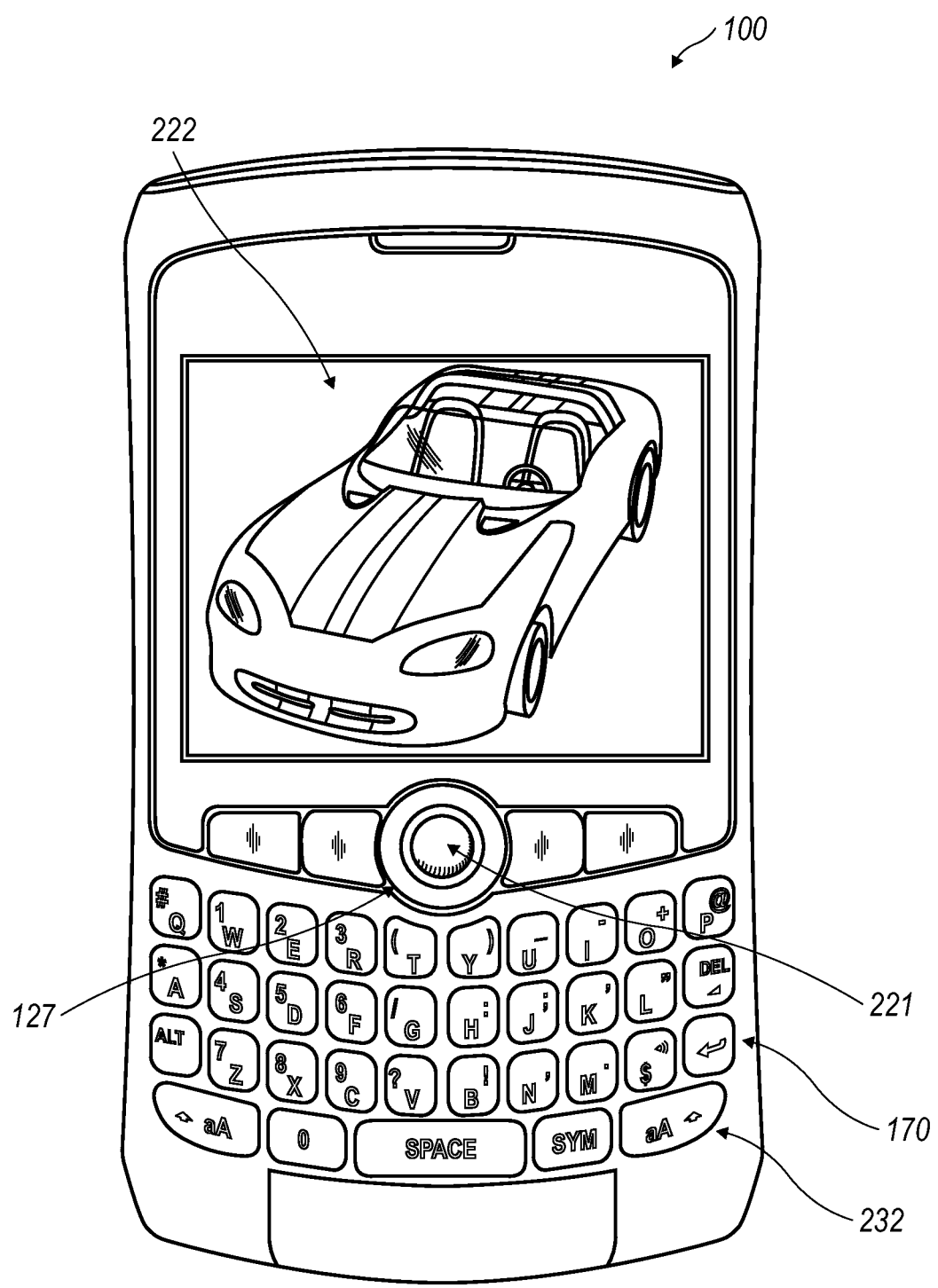
FIG. 1B is a front view of a handheld communication device having a full QWERTY keyboard in accordance with an exemplary embodiment.

Referring to FIGS. 1A and 1B, front views of handheld or electronic communication devices 100 having a reduced QWERTY keyboard and a full QWERTY keyboard 232, respectively, with each capable of incorporating a messaging application in accordance with exemplary embodiments are illustrated. Each key of the keyboard 232 can be associated with at least one indicia representing an alphabetic character, a numeral, or a command (such as a space command, return command, or the like). The plurality of the keys having alphabetic characters are arranged in a standard keyboard layout. This standard keyboard layout can be a QWERTY layout (shown in FIGS. 1A and 1B), a QZERTY layout, a QWERTZ layout, an AZERTY layout, a Dvorak layout, a Russian keyboard layout, a Chinese keyboard layout, or other similar layout. These standard layouts are provided by way of example and other similar standard layouts are considered within the scope of this disclosure. The keyboard layout can be based on the geographical region in which the handheld device is intended for sale. In some examples, the keyboard can be interchangeable such that the user can switch between layouts.

Figure 2:
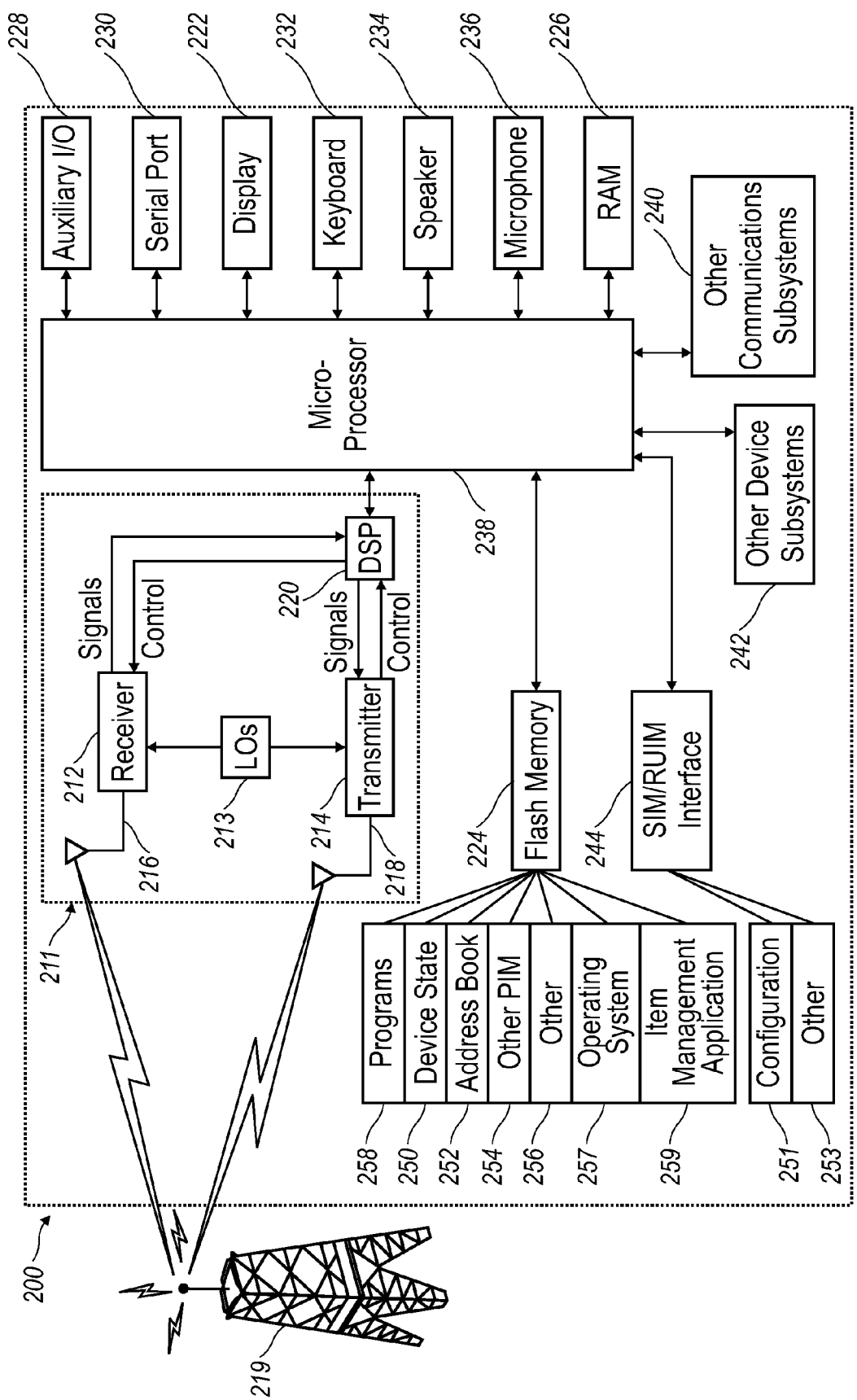
FIG. 2 is a block diagram representing a handheld communication device interacting in a communication network in accordance with an exemplary embodiment.

As shown, the exemplary communication devices 100 are communicatively coupled to a wireless network 219 as exemplified in the block diagram of FIG. 2. These figures are exemplary only, and those persons skilled in the art will appreciate that additional elements and modifications may be necessary to make the communication device 100 work in particular network environments. While in the illustrated embodiments, the communication devices 100 are smart phones, however, in other embodiments, the communication devices 100 may be personal digital assistants (PDA), laptop computers, desktop computers, servers, or other communication device capable of sending and receiving electronic messages.

Referring to FIG. 2, a block diagram of a communication device in accordance with an exemplary embodiment is illustrated. As shown, the communication device 100 includes a microprocessor 238 that controls the operation of the communication device 100. A communication subsystem 211 performs all communication transmission and reception with the wireless network 219. The microprocessor 238 further can be communicatively coupled with an auxiliary input/output (I/O) subsystem 228 which can be communicatively coupled to the communication device 100. Additionally, in at least one embodiment, the microprocessor 238 can be communicatively coupled to a serial port (for example, a Universal Serial Bus port) 230 which can allow for communication with other devices or systems via the serial port 230. A display 222 can be communicatively coupled to microprocessor 238 to allow for displaying of information to an operator of the communication device 100. When the communication device 100 is equipped with the keyboard 232, the keyboard can also be communicatively coupled with the microprocessor 238. The communication device 100 can include a speaker 234, a microphone, 236, random access memory (RAM) 226, and flash memory 224 all of which may be communicatively coupled to the microprocessor 238. Other similar components may be provided on the communication device 100 as well and optionally communicatively coupled to the microprocessor 238. Other communication subsystems 240 and other communication device subsystems 242 are generally indicated as being functionally connected with the microprocessor 238 as well. An example of a communication subsystem 240 is that of a short range communication system such as BLUETOOTH® communication module or a WI-FI® communication module (a communication module in compliance with IEEE 802.11b) and associated circuits and components. Additionally, the microprocessor 238 is able to perform operating system functions and enables execution of programs on the communication device 100. In some embodiments not all of the above components may be included in the communication device 100. For example, in at least one embodiment the keyboard 232 is not provided as a separate component and is instead integrated with a touchscreen as described below.

The auxiliary I/O subsystem 228 can take the form of a variety of different navigation tools 127 (multi-directional or single-directional) such as a trackball navigation tool 221 as illustrated in the exemplary embodiment shown in FIGS. 1A and 1B, or a thumbwheel, an optical trackpad, a navigation pad, a joystick, touch-sensitive interface, or other I/O interface. These navigation tools 127 may be located on a front face or surface 170 of the communication device 100 or may be located on any exterior surface of the communication device 100. Other auxiliary I/O subsystems can include external display devices and externally connected keyboards (not shown). While the above examples have been provided in relation to the auxiliary I/O subsystem 228, other subsystems capable of providing input or receiving output from the communication device 100 are considered within the scope of this disclosure. Additionally, other keys may be placed along the side of the communication device 100 to function as escape keys, volume control keys, scrolling keys, power switches, or user programmable keys, and may likewise be programmed accordingly.

As may be appreciated from FIGS. 1A and 1B, the communication device 100 comprises the lighted display 222 located above the keyboard 232 constituting a user input and suitable for accommodating textual input to the communication device 100. The front face 170 of the communication device 100 has a navigation row 70. As shown, the communication device 100 is of unibody construction, also known as a "candy-bar" design. In alternate embodiments, the communication device 100 can be "clamshell" or a "slider" design.

As described above, the communication device 100 may include the auxiliary input 228 that acts as a cursor navigation tool and which can be also exteriorly located upon the front face 170 of the communication device 100. Its front face location allows the tool to be easily thumb-actuable like the keys of the keyboard 232. An embodiment provides the navigation tool 127 in the form of the trackball 221, which can be utilized to instruct two-dimensional screen cursor movement in substantially any direction, as well as act as an actuator when the trackball 221 is depressed like a button. The placement of the navigation tool 127 may be above the keyboard 232 and below the display screen 222; here, it can avoid interference during keyboarding and does not block the operator's view of the display screen 222 during use, e.g., as shown in FIGS. 1A and 1B.

As illustrated in FIGS. 1A and 1B, the communication device 100 may be configured to send and receive messages. The communication device 100 includes a body 171 which may, in some embodiments, be configured to be held in one hand by an operator of the communication device 100 during text entry. The display 222 is included which is located on the front face 170 of the body 171 and upon which information is displayed to the operator during text entry. The communication device 100 may also be configured to send and receive voice communications such as mobile telephone calls. The communication device 100 may also include a camera (not shown) to allow the user to take electronic photographs which can be referred to as photos or pictures.

Furthermore, the communication device 100 is equipped with components to enable operation of various programs, as shown in FIG. 2. In an exemplary embodiment, the flash memory 224 is enabled to provide a storage location for the operating system 257, device programs 258, and data. The operating system 257 is generally configured to manage other programs 258 that are also stored in memory 224 and executable on the processor 238. The operating system 257 honors requests for services made by programs 258 through pre-defined program 258 interfaces. More specifically, the operating system 257 typically determines the order in which multiple programs 258 are executed on the processor 238 and the execution time allotted for each program 258, manages the sharing of memory 224 among multiple programs 258, handles input and output to and from other device subsystems 242, and so on. In addition, operators can typically interact directly with the operating system 257 through a user interface usually including the keyboard 232 and display screen 222. While in an exemplary embodiment the operating system 257 is stored in flash memory 224, the operating system 257 in other embodiments is stored in read-only memory (ROM) or similar storage element (not shown). As those skilled in the art will appreciate, the operating system 257, device program 258 or parts thereof may be loaded in RAM 226 or other volatile memory.

When the communication device 100 is enabled for two-way communication within the wireless communication network 219, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 may require a unique identifier to enable the communication device 100 to transmit and receive signals from the communication network 219. Other systems may not require such identifying information. GPRS, UMTS, and EDGE use a smart card such as a Subscriber Identity Module (SIM) in order to allow communication with the communication network 219. Likewise, most CDMA systems use a Removable Identity Module (RUIM) in order to communicate with the CDMA network. A smart card can be used in multiple different communication devices 100. The communication device 100 may be able to operate some features without a smart card, but it will not be able to communicate with the network 219. A smart card interface 244 located within the communication device 100 allows for removal or insertion of a smart card (not shown). The smart card features memory and holds key configurations 251, and other information 253 such as identification and subscriber related information. With a properly enabled communication device 100, two-way communication between the communication device 100 and communication network 219 is possible.

If the communication device 100 is enabled as described above or the communication network 219 does not require such enablement, the two-way communication enabled communication device 100 is able to both transmit and receive information from the communication network 219. The transfer of communication can be from the communication device 100 or to the communication device 100. In order to communicate with the communication network 219, the communication device 100 in the presently described exemplary embodiment is equipped with an integral or internal antenna 218 for transmitting signals to the communication network 219. Likewise the communication device 100 in the presently described exemplary embodiment is equipped with another antenna 216 for receiving communication from the communication network 219. These antennae (216, 218) in another exemplary embodiment are combined into a single antenna (not shown). As one skilled in the art would appreciate, the antenna or antennae (216, 218) in another embodiment are externally mounted on the communication device 100.

When equipped for two-way communication, the communication device 100 features the communication subsystem 211. As is understood in the art, this communication subsystem 211 is modified so that it can support the operational needs of the communication device 100. The subsystem 211 includes a transmitter 214 and receiver 212 including the associated antenna or antennae (216, 218) as described above, local oscillators (LOs) 213, and a processing module 220 which in the presently described exemplary embodiment is a digital signal processor (DSP) 220.

It is contemplated that communication by the communication device 100 with the wireless network 219 can be any type of communication that both the wireless network 219 and communication device 100 are enabled to transmit, receive and process. In general, these can be classified as voice and data. Voice communication generally refers to communication in which signals for audible sounds are transmitted by the communication device 100 through the communication network 219. Data generally refers to all other types of communication that the communication device 100 is capable of performing within the constraints of the wireless network 219.

The keyboard 232 can include a plurality of keys that can be of a physical nature such as actuable buttons, or they can be of a software nature, typically constituted by virtual representations of physical keys on the display screen 222 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 222, which in one embodiment is enabled by touching the display screen 222, for example, with a stylus, finger, or other pointer, to generate the character or activate the indicated command or function. Some examples of display screens 222 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular program or feature of the communication device 100 is shown on the display screen 222 in the same configuration as the physical keys. Using this configuration, the operator can select the appropriate physical key corresponding to what is shown on the display screen 222. Thus, the desired character, command or function is obtained by depressing the physical key corresponding to the character, command or function displayed at a corresponding position on the display screen 222, rather than touching the display screen 222.

While the above description generally describes the systems and components associated with a handheld communication device, the communication device 100 could be another communication device such as a PDA, a laptop computer, desktop computer, a server, or other communication device. In those embodiments, different components of the above system might be omitted in order provide the desired communication device 100. Additionally, other components not described above may be required to allow the communication device 100 to function in a desired fashion. The above description provides only general components and additional components may be required to enable the system to function. These systems and components would be appreciated by those of ordinary skill in the art.

Figure 3:
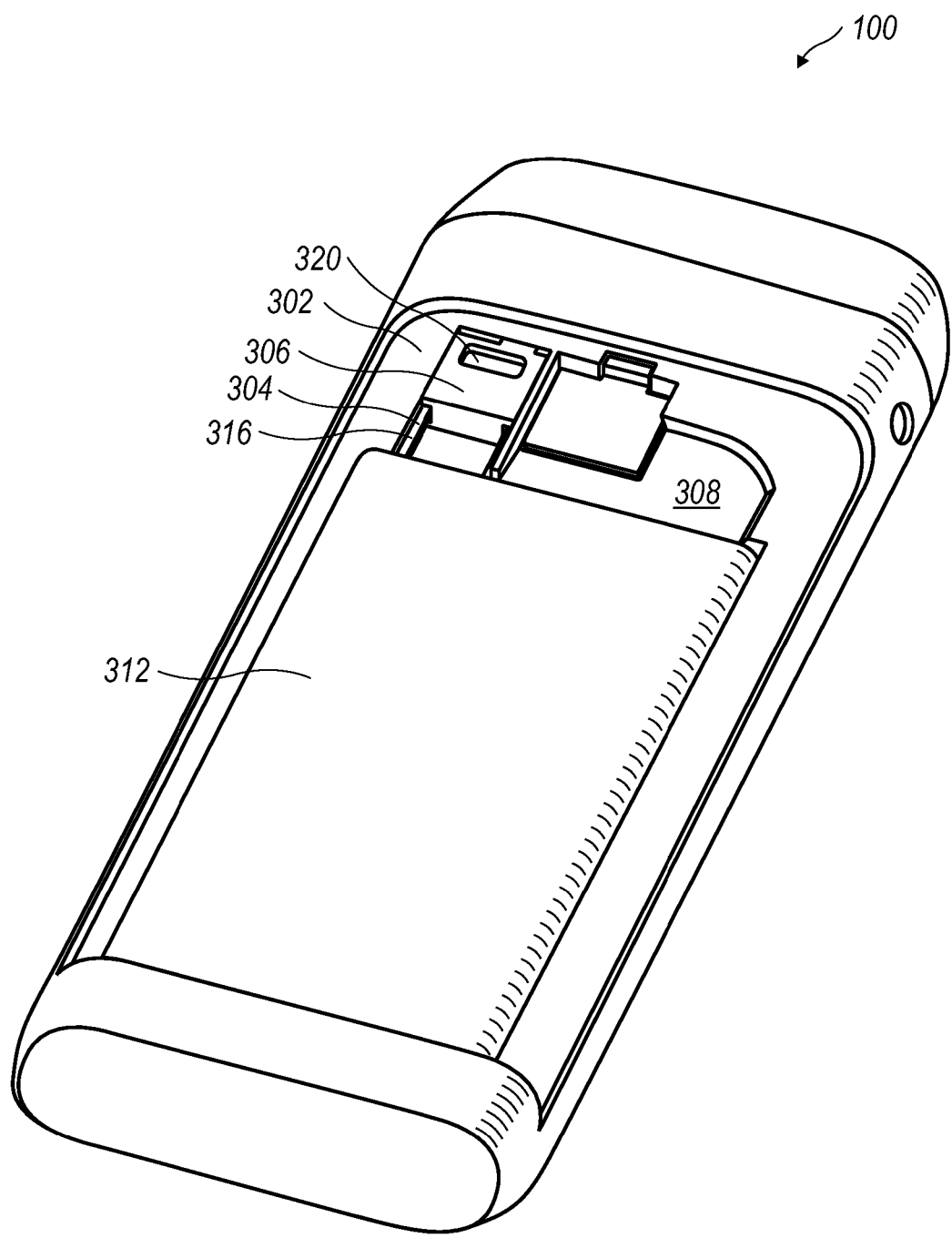
FIG. 3 is a perspective view of a smart card receiving assembly for a handheld communication device with a battery in an access compartment in accordance with an exemplary embodiment.
Figure 4:
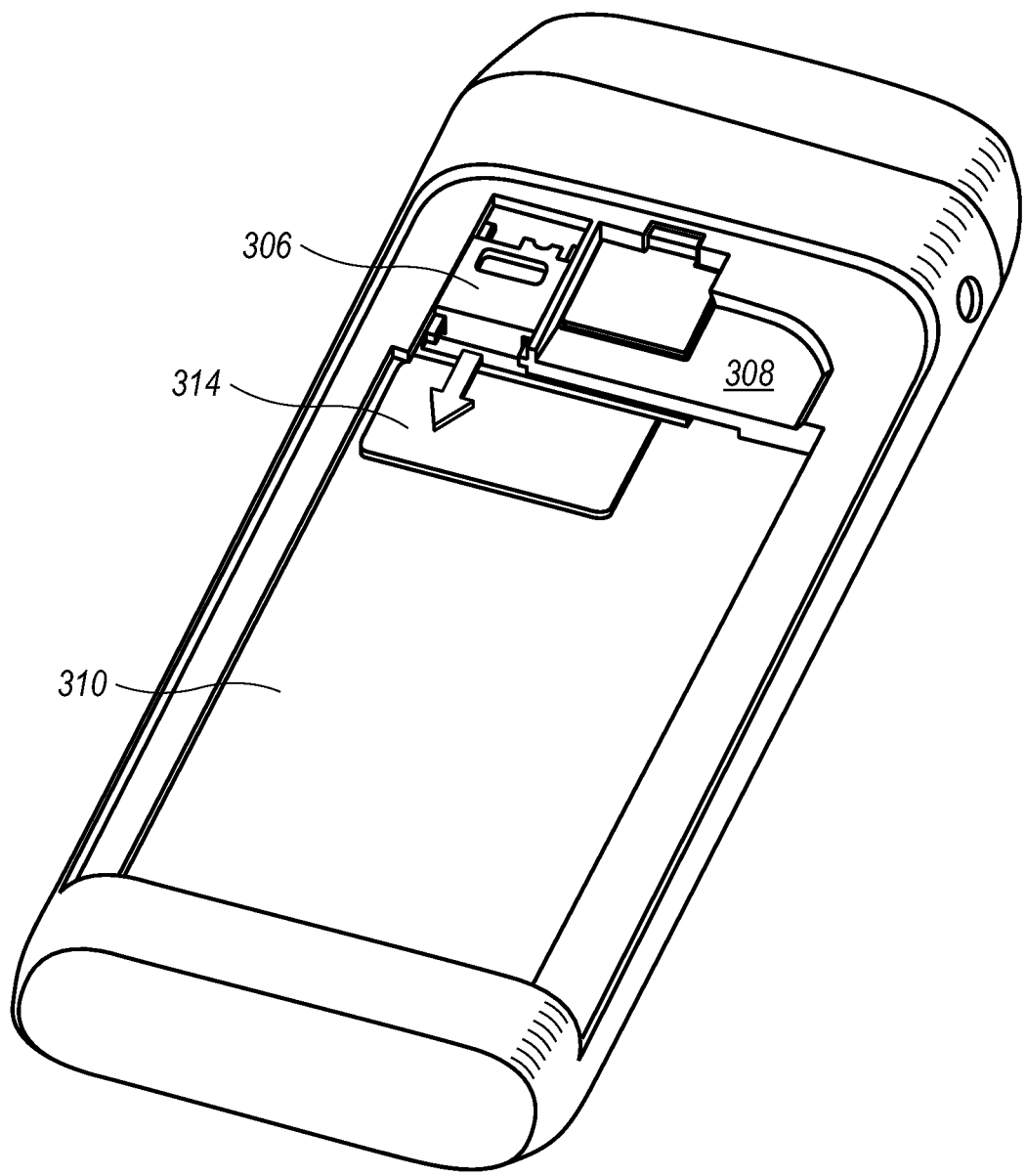
FIG. 4 is a perspective view of a smart card receiving assembly for a handheld communication device with a smart card in an access compartment in accordance with an exemplary embodiment.

Referring to FIGS. 3 and 4, perspective views of a smart card receiving assembly 302 for a handheld communication device 100 in accordance with exemplary embodiments are illustrated. As shown, the smart card receiving assembly 302 can include a housing 304, a release arm 306, and a smart card receiver 308. The housing 304 can form an access compartment 310. A cover (not shown) can cover or enclose the access compartment 310. As shown in FIG. 4, a smart card 314, e.g., a SIM card, can be inserted into the smart card receiver 308. The smart card receiver 308 can receive the entire or part of the smart card 314. As shown in FIG. 3, the access compartment 310 can be adapted to receive a battery 312 with the battery 312 being adjacent to the smart card receiver 308. When a battery 312 is inserted into the access compartment 310, the battery 312 can block or prevent the smart card 314 from being removed from the smart card receiver 308.

Figure 5:
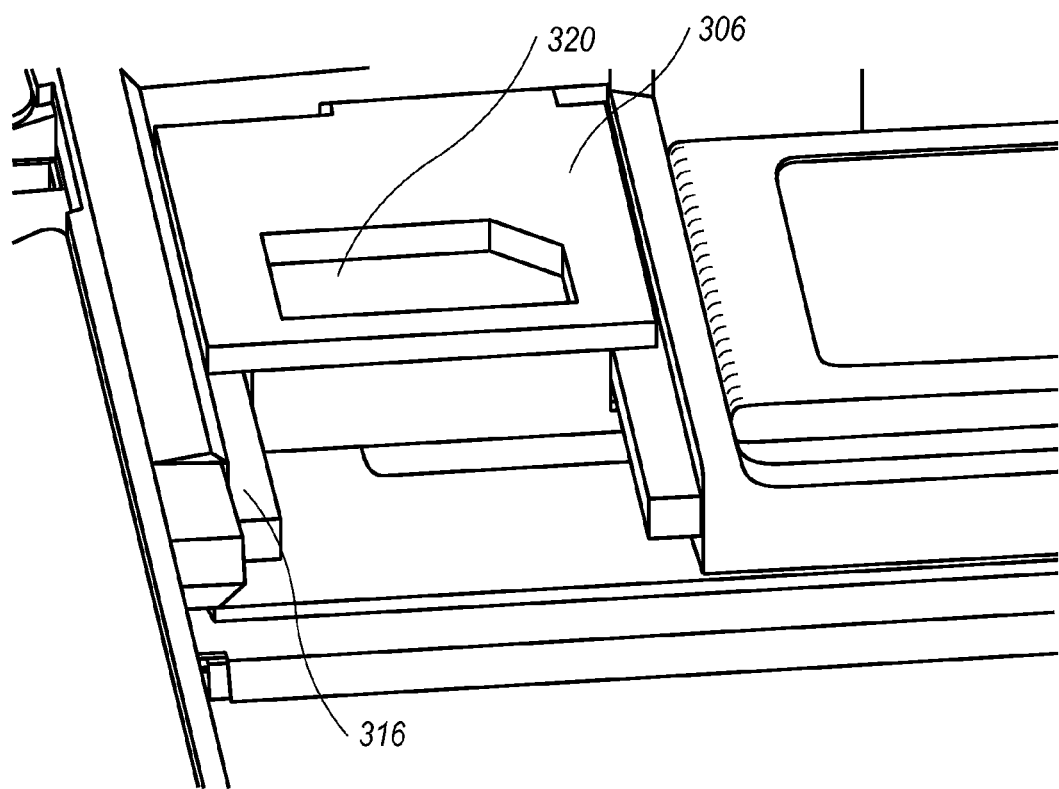
FIG. 5 is a perspective view of a release arm slidingly coupled to the housing in accordance with an exemplary embodiment.

Referring to FIGS. 3-5, perspective views of the release arm 306 slidingly coupled to the housing 304 in accordance with exemplary embodiments is illustrated. As shown, the release arm 306 can be slidingly coupled to the smart card receiving assembly 302 using one or more mating components. For example, in one or more embodiments, the housing 304 can include rails 316 and the release arm 306 can include slots 318 (as shown FIGS. 6A and 6B) with the rails 316 slidingly engaged with the slots 318 as shown in FIGS. 3-5. Alternatively, the housing 304 can include slots 318 and the release arm 306 can include rails 316 (not shown). In one or more embodiments, the release arm 306 can be slidingly coupled to other components, such as the smart card receiving assembly 302 with the rails 316 on the smart card receiving assembly 302. For example, the release arm 306 can include the rails 316 or the slots 318 and the smart card receiving assembly 302 can include the other mating component: the rails 316 or the slots 318. To assist with the sliding, the release arm 306 can include a recess 320. The recess 320 can be sized to allow a user to place his or her finger tip into the recess 320 and slide the release arm 306 from a first position to a second position.

As shown in FIG. 3, the release arm 306 can be in the first position. In the first position, the smart card 314 can be in a seated position, e.g., electrically coupled to the communication device 100. As shown in FIG. 4, the release arm 306 can be slid to the second position. In the second position, the smart card 314 can be in an unseated position, e.g., not electrically coupled to the communication device 100. By sliding the release arm 306 from the first position to the second position, the release arm 306 can force the smart card 314 to move from the seated position to the unseated position.

Figure 6A:
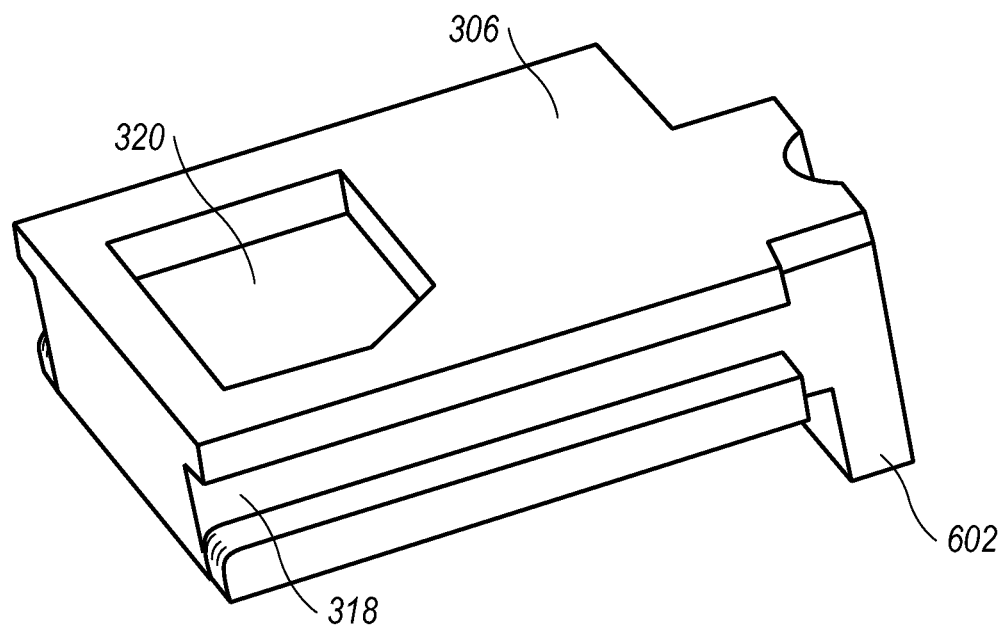
FIG. 6A a side perspective view of a release arm in accordance with an exemplary embodiment.
Figure 6B:
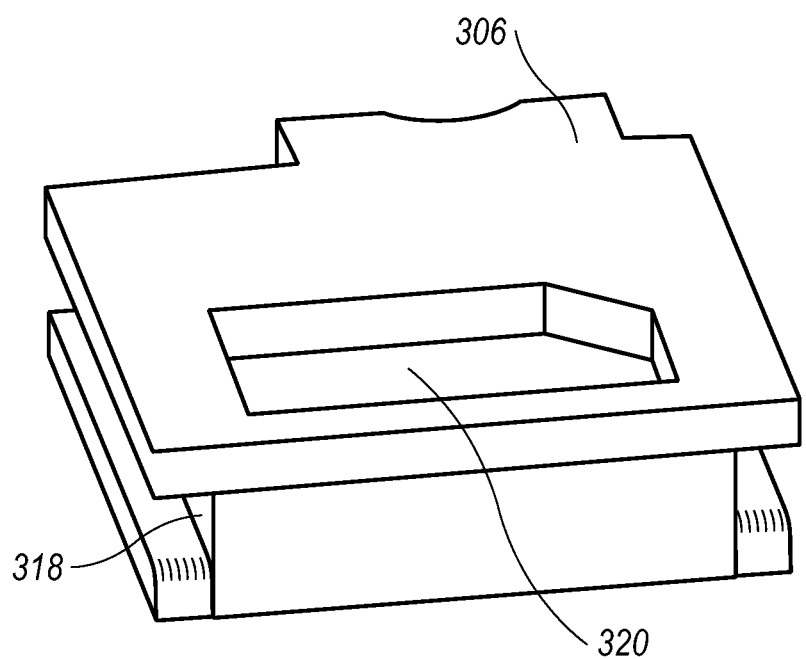
FIG. 6B a front perspective view of a release arm in accordance with an exemplary embodiment.

Referring to FIGS. 6A and 6B, side and front perspective views of the release arm 306 in accordance with exemplary embodiments are illustrated. As shown, the release arm 306 can include slots 318 for interacting with rails 316 to slidingly couple the release arm 306 to the smart card receiving assembly 302. As shown, the release arm 306 can include an extension 602 which can extend downward from the release arm 306. The extension 602 can be located on one end of the release arm 306, e.g., the end farther away from the battery 312 when the release arm 306 is slidingly engaged with the housing 304. The extension 602 can be sized to force the smart card 314 from the seated position into the unseated position. For example, when the release arm 306 slides from the seated position to the unseated position, the extension 602 can engage the smart card 314 and force the smart card 314 from the seated position to the unseated position.

The release arm 306 can be made of polyoxymethylene (POM) or any other suitable material (e.g., other plastics) to allow the release arm 306 to be slidingly coupled to the smart card receiving assembly 302. Polyoxymethylene is also known as polyactetal. POM can be used because of its sliding attributes including quietness and friction performance with materials, e.g., plastics, which can be used for the housing 304 or smart card receiving assembly 302. POM when interacting with other plastics does not typically cause noises, e.g., squeaks, and thus POM is considered to be quiet. POM when interacting with other plastics, typically does not require a large amount of force to move.

Figure 7A:
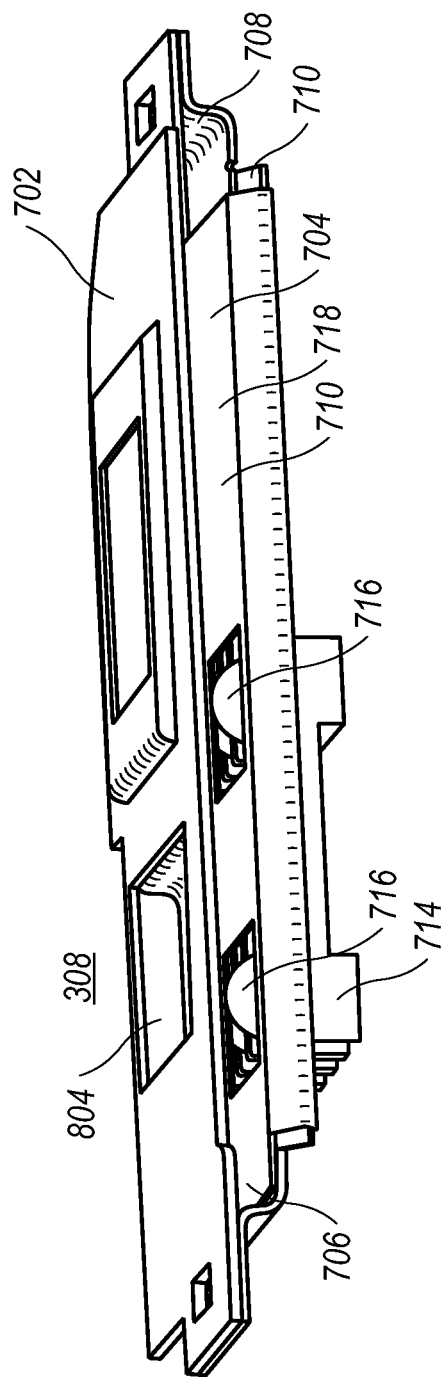
FIG. 7A is a perspective view of a smart card receiver without the release arm in accordance with an exemplary embodiment.
Figure 7B:
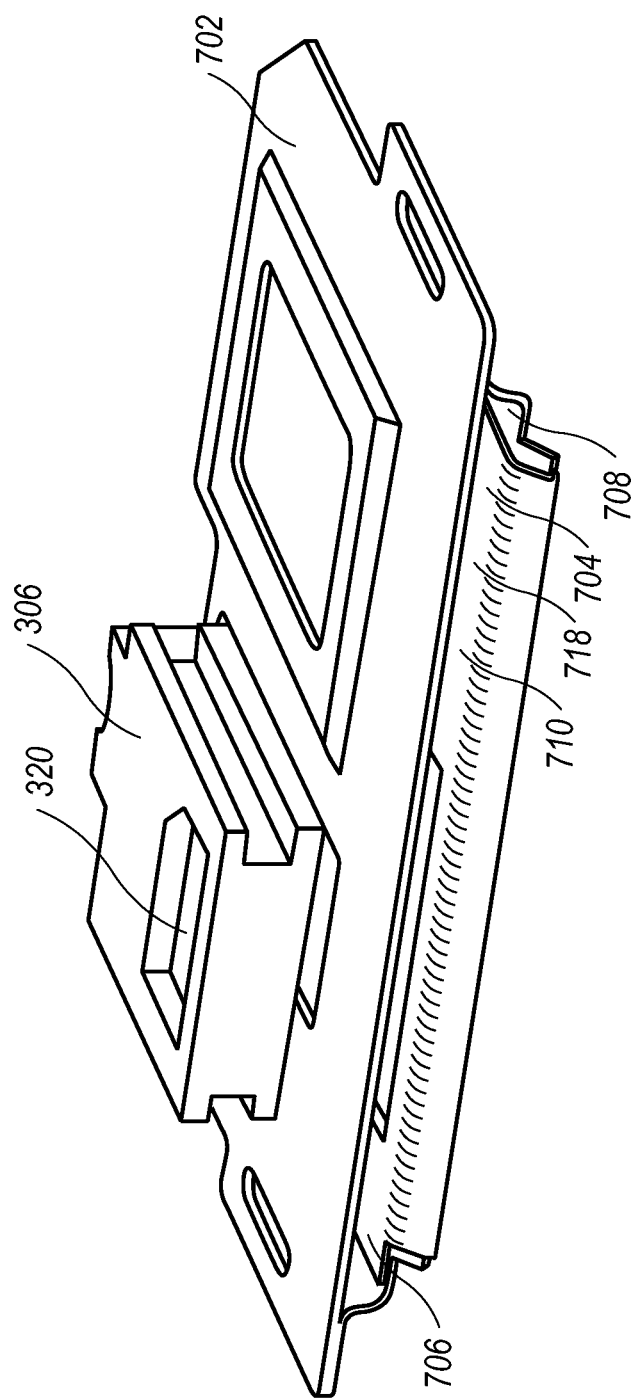
FIG. 7B is a perspective view of a smart card receiver with the release arm in accordance with an exemplary embodiment.

Referring to FIGS. 7A and 7B, perspective views of the smart card receiver 308 without and with the release arm in accordance with exemplary embodiments are illustrated, respectively. As shown, the smart card receiver 308 can be adapted to receive the smart card 314. For example, the smart card receiver 308 can include a top wall 702, bottom wall 704, and side walls 706, 708 forming an opening 710 adapted to receive the smart card 314. The smart card receiver 308 can include a cutout 712 (shown in FIG. 8) adapted to receive a smart card reader 714 having one or more contacts 716. When the smart card reader 714 is attached to the smart card receiving assembly 302, the combination can form the smart card interface 244 shown in FIG. 2. The one or more contacts 716 of the smart card reader 714 are adapted to be electrically coupled to corresponding contacts on the smart card 314 when the smart card 314 is in the seated position in the smart card receiver 308. The contacts 716 of the smart card reader 714 can be flexible to allow the smart card 314 to slide into the seated position and to retain the smart card 314 in the seated position until the release arm 306 is slid from the first position to the second position. In one or more embodiments, the smart card receiver 308 can include one or more contacts (not shown) with the one or more contacts being electrically coupled to the smart card reader.

The smart card receiver 308 can be made of metal, e.g., sheet metal, or other suitable material, such as plastic. By using a metal smart card receiver 308, the smart card receiver 308 can have smaller dimensions compared to other materials due to the strength of the metal, which can provide stiffness or rigidity to the handheld communication device 100. For example, a metal smart card receiver 308 can have a width of thirty-two millimeters (32 mm), depth of nineteen millimeters (19 mm) and a height of one and a half millimeters (1.5 mm). To make a similar smart card receiver in plastic, the smart card receiver would be bigger. For example, a plastic smart card receiver could have a width of thirty-four millimeters (34 mm), depth of twenty-one millimeters (21 mm) and a height of six millimeters (6 mm).

To avoid electrical shorts with the metal smart card receiver 308, the smart card receiver 308 can include a nonconductive layer 718. For example, the nonconductive layer 718 can be tape, print, or another non-conductive material on at least the internal surface of the bottom wall 704 of the smart card receiver 308 or on the internal surfaces of the top wall 702, bottom wall 704 and side walls 706, 708 forming the opening 710.

Figure 8:
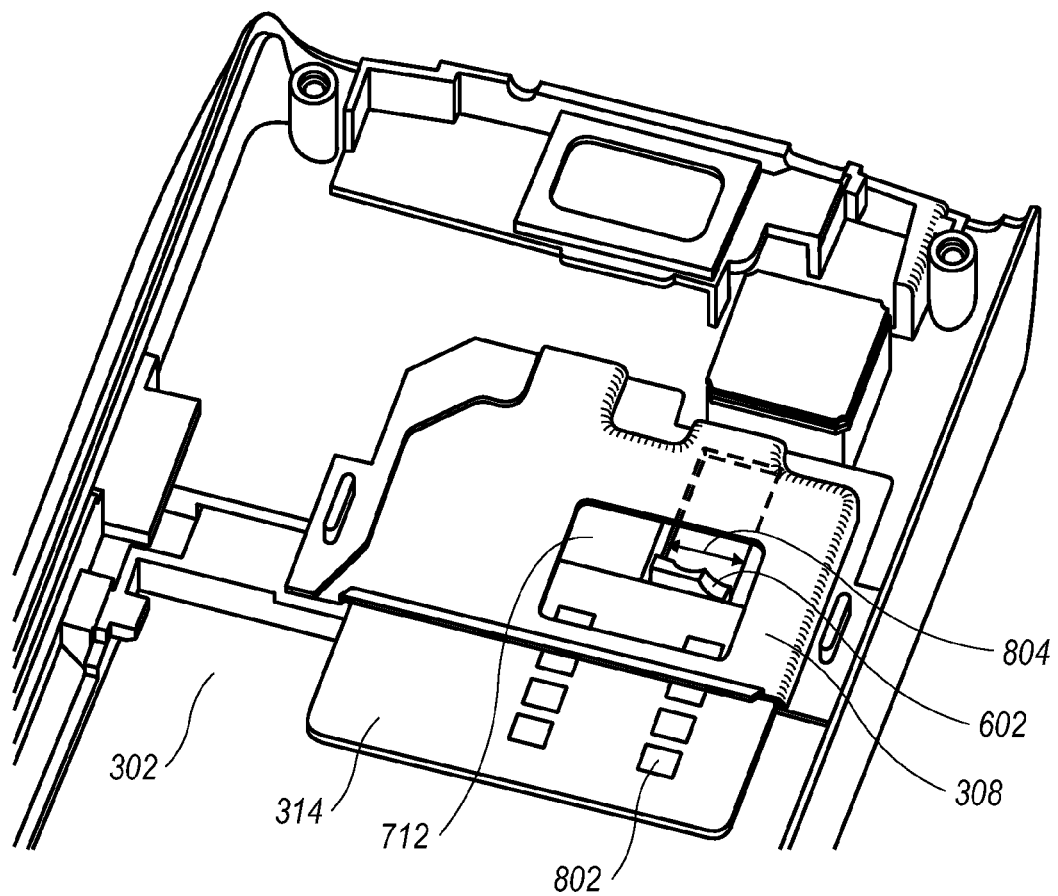
FIG. 8 is a perspective view of the underside of a smart card receiving assembly with a smart card interacting with the smart card receiver in accordance with an exemplary embodiment.

Referring to FIG. 8, a perspective view of the underside of the smart card receiving assembly 302 with the smart card 314 interacting with the smart card receiver 308 in accordance with an exemplary embodiment is illustrated. To show one or more contacts 802 on the smart card 314, the smart card reader 714 is not included in this figure. To insert the smart card 314 into the smart card receiver 308, a user can push the smart card 314 into the opening 710 causing the smart card 314 to engage the extension 602 of the release arm 306 and moving the release arm 306 from the second position to the first position. To remove the smart card 314 from the smart card receiver 308, the user can slide the release arm 306 (not shown) from the first position to the second position. In moving the release arm 306 from the first position to the second position, the extension 602 of the release arm 306 contacts and forces the smart card 314 to move from the seated position to the unseated position and into the access compartment 310. Since the extension 602 extends below the release arm 306, the smart card receiver 308 can include a channel or opening 804 (also shown in FIG. 7A). The channel 804 can be adapted or formed to allow the extension 602 to move within the channel 804. In one or more embodiments, the extension 602 moves freely within the channel 804.

Exemplary embodiments have been described hereinabove regarding the implementation of a smart card receiving assembly for a handheld communication device. Various modifications to and departures from the disclosed embodiments will occur to those having skill in the art. The subject matter that is intended to be within the spirit of this disclosure is set forth in the following claims.

The invention claimed is:

1. A smart card receiving assembly for a handheld communication device comprising:
a housing forming an access compartment;
a release arm slidably coupled to the housing and comprising a downward extension extending downward beyond a bottom surface of the release arm, the release arm further comprises a recess sized to receive an external object to aid the movement of the release arm;
a smart card receiver with an opening adapted to receive a smart card there through with a first side of the smart card exposed to the access compartment by the opening and a bottom cutout sized to expose the the electrical contacts of the smart card;
wherein at least one of the housing and release arm includes slots and the other includes rails configured to be received in the slots and wherein those portions of the rails that are configured to be received in the slots have a longitudinal length that is longer than a longitudinal length of the slots;
and wherein when the release arm is moved from a first position to a second position, the downward extension is configured to press against a second side of the smart card to move the smart card from a seated position to an unseated position and to at least partially slide out of the smart card receiver and into the access compartment, and wherein the rails and slots are configured to guide the downward extension when the release arm is slid from the first position to the second position.

2. The smart card receiving assembly of claim 1 wherein the release arm is polyoxymethylene.

3. The smart card receiving assembly of claim 1 wherein the smart card receiver is metal.

4. The smart card receiving assembly of claim 3 wherein the smart card receiver further comprises a non-conductive layer.

5. The smart card receiving assembly of claim 4 wherein the non-conductive layer is at least one of tape and print.

6. The smart card receiving assembly of claim 1 wherein the smart card receiver further includes a smart card reader having at least one contact positioned to be electrically coupled to at least one corresponding contact on the smart card when the smart card is in the seated position.

7. The smart card receiving assembly of claim 1 wherein the access compartment is adapted to receive a battery.

8. The smart card receiving assembly of claim 7 wherein the smart card is locked in the seated position when the battery is positioned within the access compartment.

9. The smart card receiving assembly of claim 1 further comprising the smart card.

10. The smart card receiving assembly of claim 1 wherein at least one of the housing and release arm includes slots and the other includes rails adapted to be received in the slots.

11. A handheld communication comprising:
a smart card;
a housing forming an access compartment;
a release arm slidably coupled to the housing and comprising a downward extension extending downward beyond a bottom surface of the release arm, the release arm further comprises a recess sized to receive an external object to aid the movement of the release arm;
a smart card receiver with an opening adapted to receive the smart card there through with a first side of the smart card exposed to the access compartment by the opening and and a bottom cutout sized to expose the the electrical contacts of the smart card;
wherein at least one of the housing and release arm includes slots and the other includes rails configured to be received in the slots and wherein those portions of the rails that are configured to be received in the slots have a longitudinal length that is longer than a longitudinal length of the slots;
and wherein when the release arm is moved from a first position to a second position, the downward extension is configured to press against a second side of the smart card to move the smart card from a seated position to an unseated position and to at least partially slide out of the smart card receiver and into the access compartment, wherein the rails and slots are configured to guide the downward extension when the release arm is slid from the first position to the second position.

12. The handheld communication device of claim 11 wherein the release arm is polyoxymethylene.

13. The handheld communication device of claim 11 wherein the smart card receiver is metal.

14. The handheld communication device of claim 13 wherein the smart card receiver further comprises a non-conductive layer.

15. The handheld communication device of claim 14 wherein the non-conductive layer is at least one of tape and print.

16. The handheld communication device of claim 11 wherein the smart card receiver further includes a smart card reader having at least one contact positioned to be electrically coupled to at least one corresponding contact on the smart card when the smart card is in the seated position.

17. The handheld communication device of claim 11 wherein the smart card receiver further includes at least one contact coupled to a smart card reader.

18. The handheld communication device of claim 11 wherein the access compartment is adapted to receive a battery.

19. The handheld communication device of claim 18 wherein the smart card is locked in the seated position when the battery is positioned within the access compartment.

20. The handheld communication device of claim 8 wherein at least one of the housing and release arm includes slots and the other includes rails adapted to be received in the slots.

* * * * *